United States Patent [19]
Kingston et al.

[11] Patent Number: 5,128,958
[45] Date of Patent: Jul. 7, 1992

[54] DIGITAL TIME ERROR SIGNAL GENERATOR

[75] Inventors: Samuel C. Kingston; Steven T. Barham, both of Salt Lake City; Harold L. Simonsen, West Valley City, all of Utah

[73] Assignee: Unisys Corp., Blue Bell, Pa.

[21] Appl. No.: 559,015

[22] Filed: Jul. 26, 1990

[51] Int. Cl.$^5$ ............................................. H04L 27/30
[52] U.S. Cl. ........................................ 375/1; 375/120
[58] Field of Search ................... 375/81, 118, 119, 120

[56] References Cited

U.S. PATENT DOCUMENTS 4,166,979  9/1979  Waggener ............................ 375/120
4,301,537  11/1981 Roos ..................................... 375/1

Primary Examiner—Bernarr E. Gregory
Attorney, Agent, or Firm—John B. Sowell; Mark T. Starr

[57] ABSTRACT

A time error signal generator of the type employed in symbol time tracking loops is provided with a pre-accumulate and scale circuit for receiving an input data stream which is applied to a digital early sample-late sample circuit for generation an error signal indicative of a time magnitude difference between the analog transition time of the data and the chip strobe time multiplied by the sign of the data. The output of the early sample-late sample circuit is applied to a second accumulate and scale circuit for generating an accumulated error signal which is applied to an inverter. The inverter is provided with a decision directed tracking input indicative of the sign of the data sample and is employed to invert the accumulated error signal when the sign of the analog data is negative. The output of the inverter provides a digital time error tracking signal which is adapted to be coupled to a clock generation circuit or clock synthesizer for generating the tracking loop system clock as well as other strobe timing signals.

10 Claims, 4 Drawing Sheets

DIGITAL TIME ERROR SIGNAL GENERATOR

BACKGROUND OF THE INVENTION

1. Field of the Invention

The present invention relates to a novel digital time error generator of the type employed to produce an error signal indicative of the difference between sampling time and the data transition time. More particularly, the present invention relates to a time error generator for producing a digital sample rate frequency command employed by a clock synthesizer and the timing and control circuits, which are synchronized with the data signal transitions received by a communication receiver.

2. Description of the Prior Art

Heretofore, digital time error signal generators have been proposed for use in communication receivers, such proposed systems have employed separate off the shelf timing and control modules which are not programmable by frequency commands, accordingly, there is no known prior art digital error signal generator circuitry known to have been integrated into a very large scale integrated circuit communications receiver.

There is an unmet need for a complete on chip digital time error signal generator capable of being programmed for generating digital commands which may be applied to conventional off chip digital clock synthesizers of the type employed with on chip timing and control circuits of digital communication receivers.

SUMMARY OF THE INVENTION

It is a primary object of the present invention to provide a all digital error signal generator used for control of a clock synthesizer.

It is another primary object of the present invention to provide an all digital error signal generator which is capable of sampling data at the data transition rate.

It is another principle object of the present invention to provide a novel digital error signal generator used to control digital circuits which produce the system clock of a code or a symbol tracking loop of a communications receiver.

It is a general object of the present invention to sense the time signal difference between input data transitions and chip strobe time generated in the timing and control circuits of a communications receiver.

It is an object of the present invention to provide an error signal generator having programmable chip rate and data rate times.

It is another object of the present invention to provide off chip programmability of the sensitivity and data throughput of a digital error signal generator of a communications receiver.

It is another general object of the present invention to provide a novel digital time error signal generator capable of processing input data of different code types and different modulation types.

It is a general object of the present invention to provide a simple drift free digital error signal generator which may be easily implemented on a very large scaled integrated circuit chip with other system components of a communications receiver.

According to these and other objects of the present invention, the data to be analyzed in the error signal generator is first processed in a novel digital early sample-late sample circuit before being accumulated and scaled to provide a digital error signal which is multiplied by the sign of the data. The sign of the data which produced the transition error is detected and applied as a control signal to an inverter. The digital error signal is passed through the decision directed inverter to provide an error signal output with the sign error removed through decision directed tracking. The corrected digital error signal is then passed through a filter to produce a sample rate frequency command which may be applied to a clock synthesizer in a code tracking loop to synchronize the data with the symbol time.

DESCRIPTION OF THE PREFERRED EMBODIMENT

Figure 1:
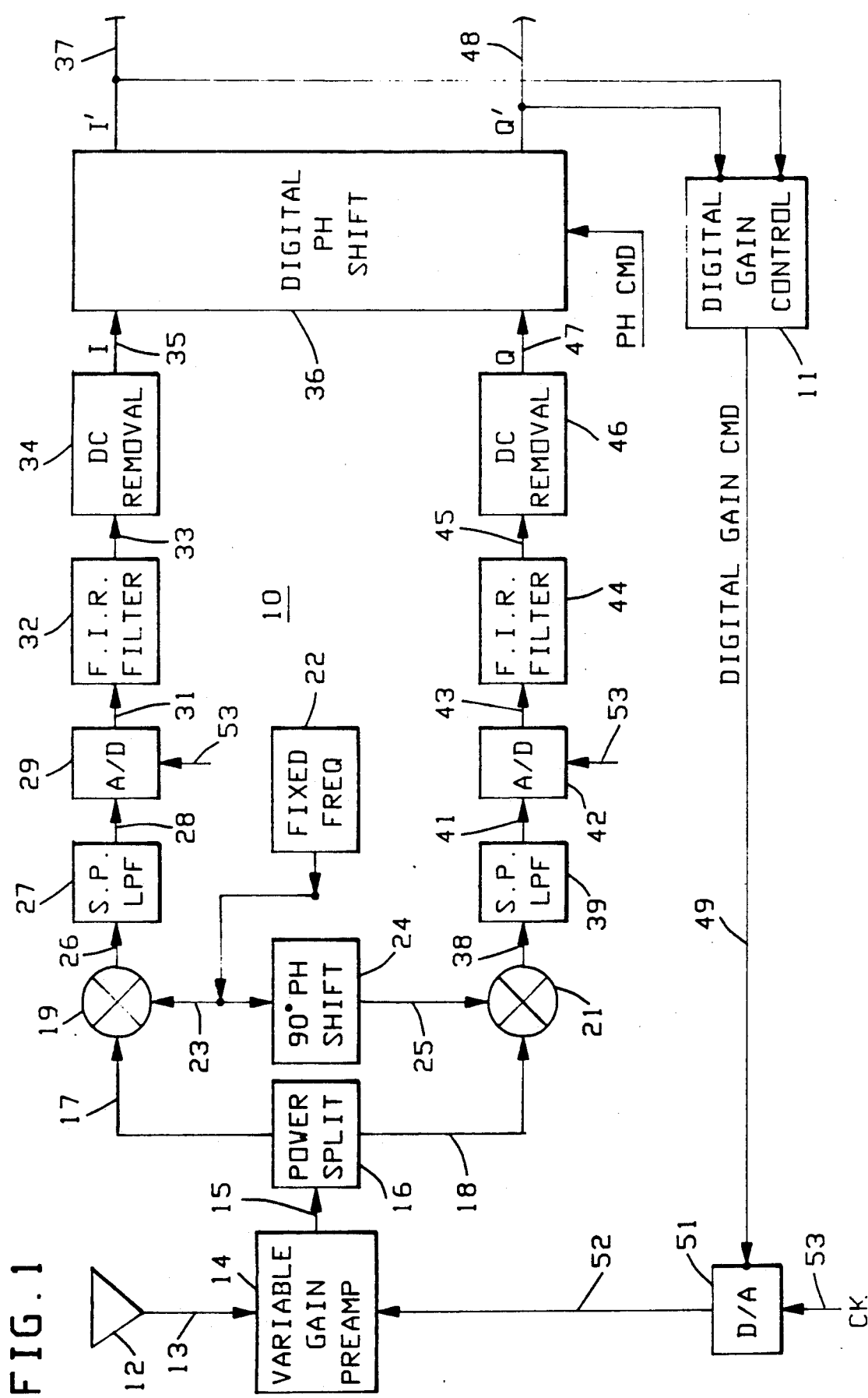
FIG. 1 is a schematic block diagram of a communications receiver pre-processing circuit illustrating a preferred embodiment use of the present invention digital code or symbol tracking loop.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals controlled by the present invention such as that shown on line 53 are applied to the A to D converters 29 and 42 and the digital blocks which occur after. The low pass filters 27 and 39 may be constructed as RC filter circuits and the FIR filters 32 and 44 may be constructed in the manner shown in my U.S. Pat. No. 4,808,939. It will be understood that all of schematic blocks shown in the FIG. 1 embodiment need not be constructed according to my previously mentioned patents but may be constructed by other equivalent circuits known in the prior art.

Figure 2:
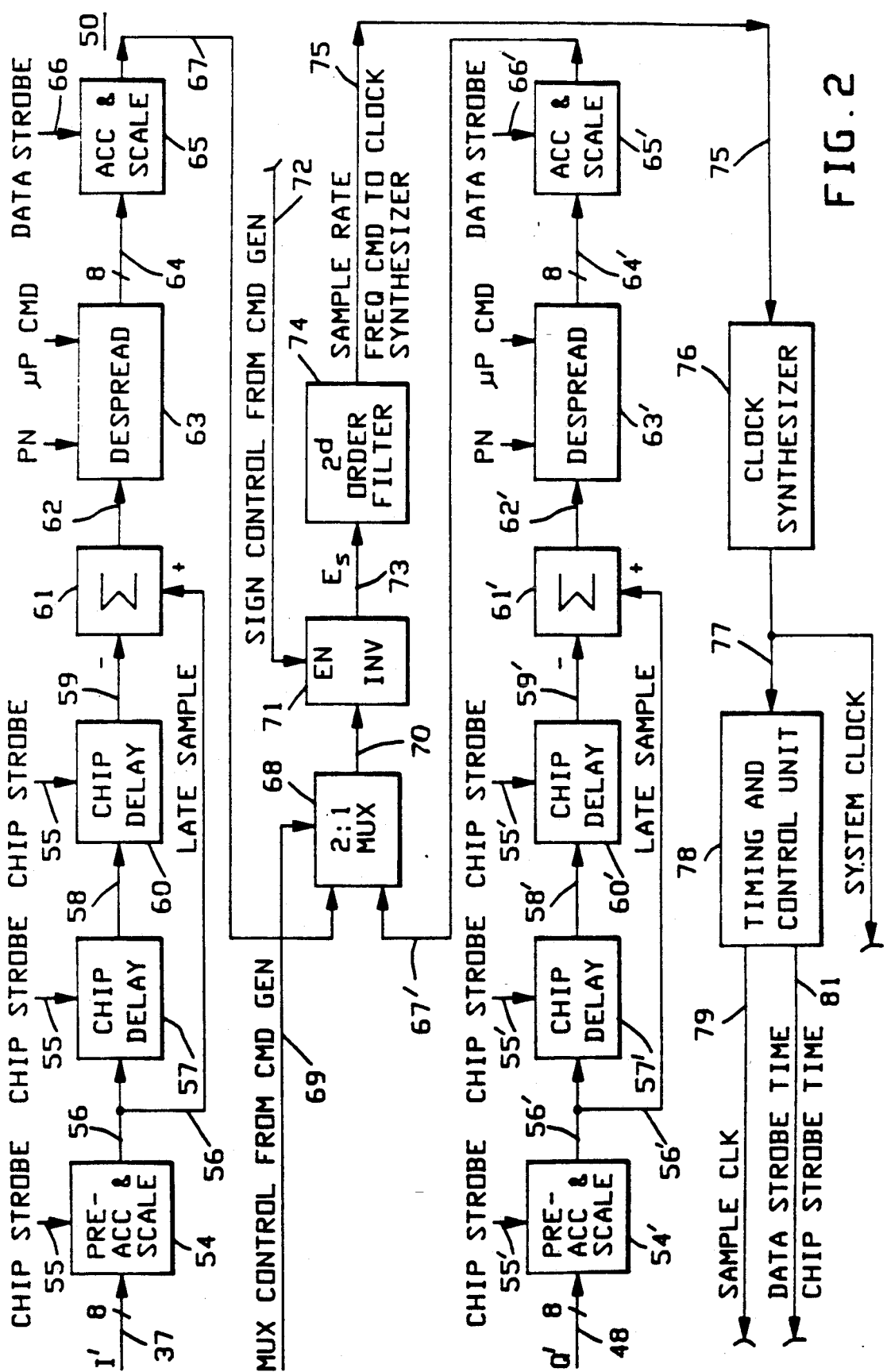
FIG. 2 is a schematic block diagram of a preferred embodiment programmable digital time error signal generator.

Refer now to FIG. 2 showing a schematic block diagram of a preferred embodiment programmable digital time error signal generator 50. The real or I' channel input on line 37 represents the phase corrected data for the I channel and the data on line 48 represents the phase corrected imaginary or quadrature channel Q. Data on line 37 is applied to a pre-accumulate and scale circuit 54 which accumulates the incoming 8 bits until a chip strobe on line 55 is received. The chip strobe signal causes the accumulated and scaled data to be dumped onto output line 56 in a manner which will be discussed in greater detail hereinafter. The accumulated and scaled data on line 56 is applied to a chip delay circuit 57 which is strobed by the same chip strobe signal 55 to produce delayed accumulated and scaled data information on line 58 which is again delayed by chip delay 60 and strobed to output line 59 which is connected to the negative input of summing circuit 61 which receives the late sample of the data on line 56 at the positive input of the summing circuit 61. Thus, the data on line 59 is the early version of the on time delayed data and the summing circuit 61 subtracts an early chip sample from a late chip sample. The output of summing circuit 61 on line 62 is applied to a despreading circuit 63 which is activated if the information received on line 37 has been previously spread. The despreading circuit 63 is deactivated by employing a constant PN level. The despread circuit 63 is active when the microprocessor command defines the type of despread being applied and that a proper despreading code is also applied. The recovered despread information on output line 64 is applied to a bit rate accumulate and scale circuit 65 which receives its bit rate data strobe on line 66. The manner in which the accumulate and scale circuit 65 produces an accumulated an scale error signal on line 67 will be described in greater detail hereinafter. For purposes of the present invention, it will be understood that the portion of the circuit from the input line 37 to the output of the despread circuit 63 may be considered as an early sample-late sample circuit means which generates an error signal indicative of the time magnitude difference between the transition time of the analog data downstream and the chip strobe time which will be generated by the timing and control circuits to be explained hereinafter. It will be understood that the digital data which appears at the input of pre-accumulate and scale circuit 54 also contains information which will identify the transition time of the analog data signal.

The accumulated error signal on line 67 is shown coupled to a multiplexor 68 which is controlled by a MUX control signal from the command generator (not shown) on line 69. The output of the multiplexor 68 on line 70 is applied to a decision directed inverter circuit 71 which has an enable or sign control decision input coupled to a sign control signal on line 72 from the command generator (not shown). It is only necessary to determine the sign of the data in the I channel and apply this sign as a positive or negative enable or not enable signal to the inverter 71. The information on line 67 is indicative of the difference between the transition time and the chip strobe time multiplied by the sign of the data and this will cause the error information to be 180° out of phase for negative data. The sign control signal on line 72 resolves this phase ambiguity. Thus, the error signal output from decision directed inverter 71 on line 73 is an error signal magnitude $E_s$ which also contains a proper sign. The error signal on line 73 is applied to a filter 74. In the preferred embodiment of the present invention, the filter selected for best mode of operation is a second order filter which produces a frequency command containing sufficient information on line 75 to direct the clock synthesizer 76 to a desired frequency (or some system clock time) which will reduce the $E_s$ error signal on line 73 to zero. The system clock on line 77 is applied to the digital to analog converter 51 shown in FIG. 1 as well as filters 32 and 44 and other components in the system. For purposes of the present invention, the timing and control unit 78 receives a system clock and produces on output line 79 and 81 the sampling clock, the data strobe time and the chip strobe time used in the FIG. 2 embodiment of the digital time error signal generator.

Since the components in the I channel and the components in the Q channel are identical and are operated by similar strobe signals, to simplify the explanation of the present invention, the components and lines in the Q channel have been numbered with identical numbers using prime suffixes to the component numbers in the I channel and their description is the same. However, it will be understood that there are exceptions and instances in which the Q data strobe signals may be different from the I data strobe signals. Such requirements for different strobe signals are well known in this art and do not require further explanation. Before referring to FIG. 3 it will be noted that a pre-accumulate and scale circuit 54 is provided in the novel early sample-late sample circuit means which is strobed at the chip rate. A second novel accumulate and scale circuit 65 is shown being strobed at the bit data strobe rate. As will be explained hereinafter both of these accumulator and scale circuits may be made in the same manner using the same components.

Figure 3:
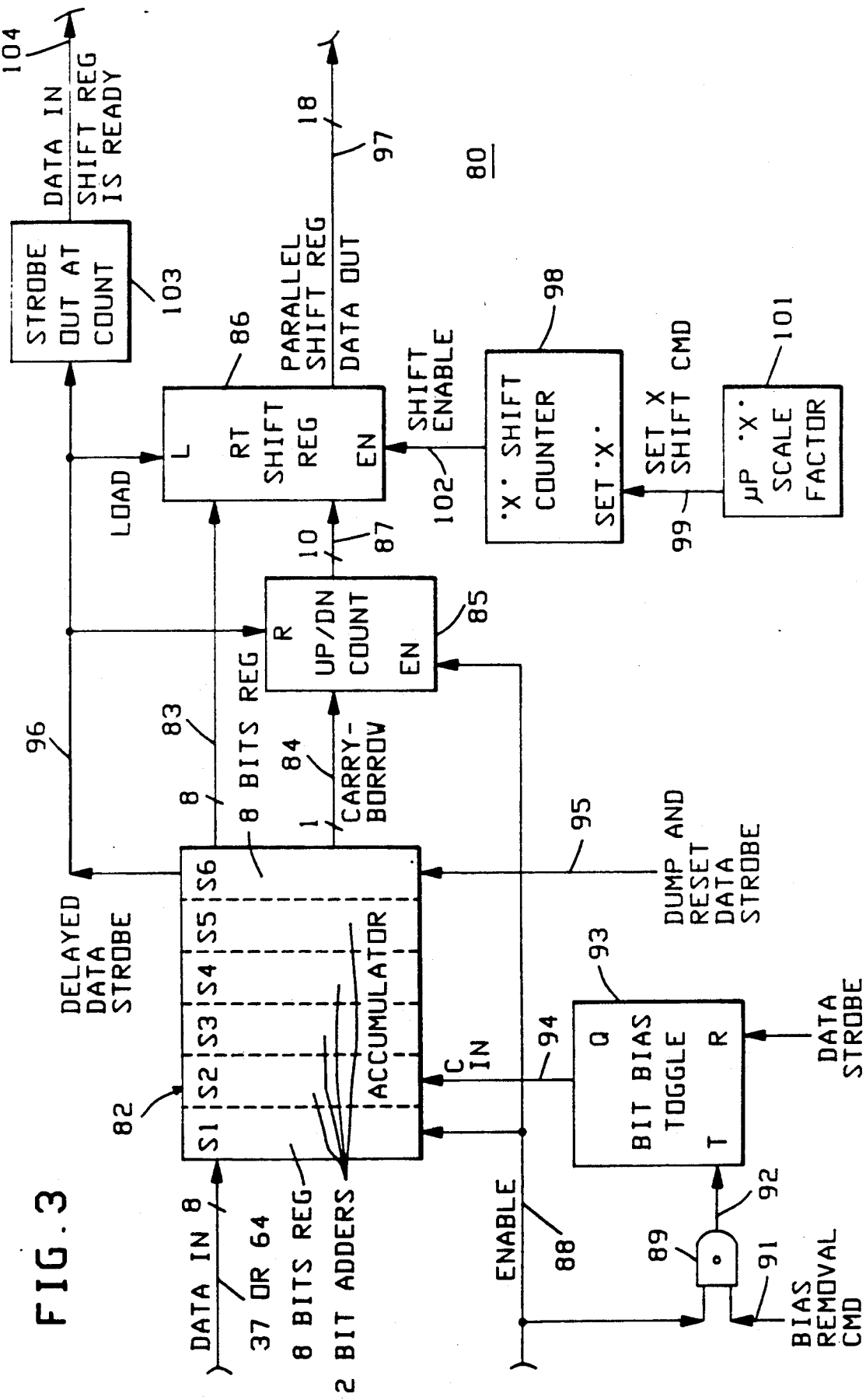
FIG. 3 is schematic block diagram of a preferred embodiment programmable digital accumulator and scale circuit.

Refer now to FIG. 3 showing a schematic block diagram of a preferred embodiment programmable digital accumulate and scale circuit 80. In the preferred embodiment of the present invention, eight bit parallel data is occurring on input lines 37 or 64 or their channel equivalents which is applied to the input stage of accumulator 82. In the preferred embodiment of the present invention, the accumulator 82 may be configured as a pipeline accumulator which has an input register S1 and an 8-bit output register S6. The intermediate stages S2 through S5 are representative of four stages each having 2-bit adders configured in a pipeline configuration so as to produce a basic output of 8 bits on line 83 and the four intermediate stages will produce carry or borrow bits on line 84 which are applied to a 10 stage up or down counter 85 to produce an additional 10 bits for the 18 bit shift register 86 which comprises the output stage or output register of the accumulate and scale circuit. It will be understood that the accumulator 82 can be an 18 stage accumulator which would eliminate the need for the up/down counter which highly simplifies the present embodiment 18 bit output accumulator.

An enable signal on line 88 is shown being applied to the input stage S1 and the enable input of the up/down counter 85. This enable signal is generated at the timing and control unit 78 and is a necessary input for the up/down counter and the accumulate and scale circuit 65. The preaccumulate and scale circuit 54 may be tied to high anable signal and does not require the same enable signal. Enable input line 88 is applied to AND gate 89 along with a bias removal command signal on line 91 which may be hard wired preset or programmable by the microprocessor. The output line 92 from AND gate 89 serves to toggle the bit bias toggle circuit 93 so as to produce a carry in signal on line 94 every other enable time.

The reason for applying a 1 bit carry in every other enable time is to provide a one-half bit carry in every enable time which compensates for the truncation of the least significant bit figures which occur upstream in the FIG. 1 components.

The dump and reset data strobe signal on line 95 is applied to the output stage of the accumulator 82. The up/down counter 85 is reset by a delayed strobe on output line 96 which causes the right shift register 86 to be loaded with the information on lines 83 and 87 while resetting the output stage and the up and down counter. The output of the right shift register 86 on line 97 may be scaled by the novel scaling circuit comprising an X shift counter 98 adapted to receive via line 99 a scaling factor which is generated by the microprocessor (not shown) as a programmable X input. The command at box 101 will set the X shift counter 98 to the scale factor X which is counted down while generating a shift enable signal on line 102 which enables the right shift register to output or shift out the number of stages indicated by the X scale factor.

Another feature of the present invention is the strobe out generator 103 which receives the delayed strobe signal on line 96 when the right shift register 86 is first loaded. Since the X shift counter 98 is the means by which the information in right shift register 86 is outputted on line 97 the shifted output on line 97 should be complete by the end of the X shift counter operation which is limited to less than 16 stages. Thus, by setting the output strobe count to the maximum count of the X shift register, all of the output data on line 97 should be complete If no subsequent delayed data strobe on line 96 has occurred at the input of strobe out counter 103, a signal on line 104 is generated indicating that the information in the right shift register 86 is set and can be utilized.

Figure 4:
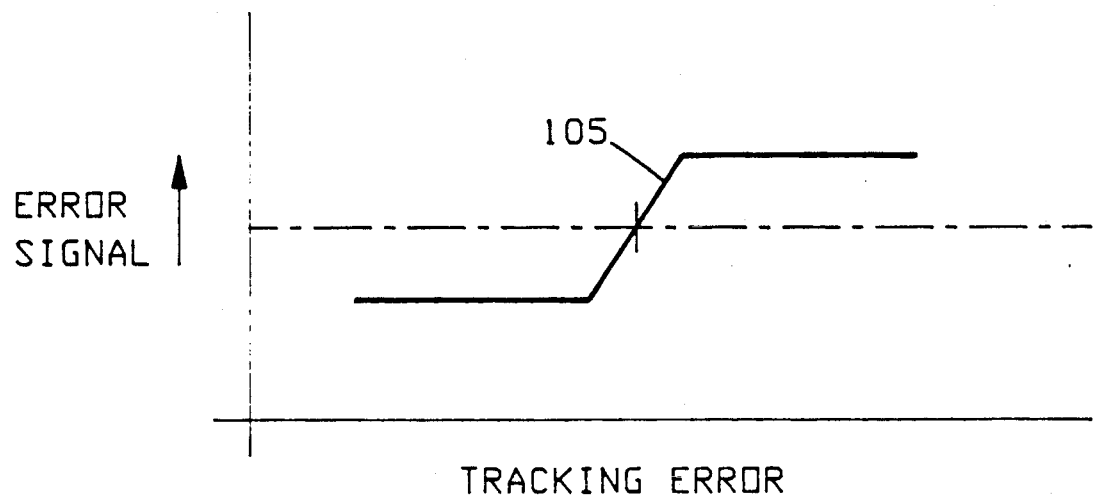
FIG. 4 is a typical tracking error "S" curve for sensitive response.
Figure 5:
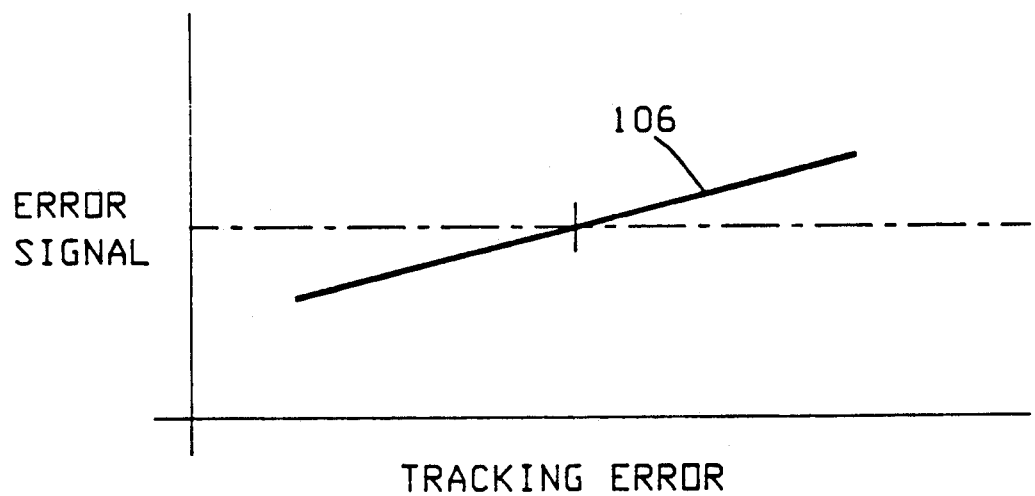
FIG. 5 is a typical uniform tracking error "S" curve for broad response.

A feature of the present invention is that the shift times and bit times employed as strobes in FIG. 2 may be off chip programmed. When the chip time is small compared to the transition time, the tracking error S curve is most sensitive. Accordingly, refer now to FIG. 4 showing a typical tracking error S curve for a sensitive response chip time. FIG. 4 shows the slope 105 of the error signal versus the tracking error signal as having a steep slope which results from small time difference between the early and late sampling times. Refer to FIG. 5 which shows a typical uniform tracking S curve for broad response which occurs when the chip time is approximately equal to the time between phase transitions as shown by the uniform slope 106.

Having explained a preferred embodiment programmable digital time error signal generator and a preferred embodiment programmable digital accumulate and scale circuit in a preferred embodiment time tracking loop environment it will be appreciated that the circuit components employed may be easily implemented on a very large scale integrated circuit chip with other system components of a communications receiver It is possible to use a commercially available clock synthesizer 76 off chip and bring the output signal on line 77 back to an on chip timing and control unit 78 to further simplify a preferred embodiment tracking loop.

It will be understood that the preferred embodiment accumulate and scale circuit described in FIG. 3 is a preferred embodiment to be employed in the FIG. 2 time error signal generator and other embodiments and other forms of accumulate and scale circuits would not render the time error signal generator inoperable.

What is claimed is:

1. A digital time error signal generator circuit of the type employed to synchronize input data and chip strobe time of a communications receiver, comprising:
   input data means,
   digital early sample-late sample circuit means coupled to said input data means to provide a stream of input data for generating an output error signal indicative of a time magnitude difference between transition time of the input data and chip strobe time of the generator circuit multiplied by the sign of the input data,
   accumulate and scale means coupled to an output of said digital early sample-late sample circuit means for generating an accumulated error signal,
   inverter means having input means coupled to said accumulated error signal, and
   decision directed sign control input means coupled to said inverter means for indicating the sign of the input data and inverting said accumulated error signal sign when the sign of the input data is negative,
   said inverter means having an output port which provides a digital time error tracking signal used for synchronizing the occurrence of said chip strobe time with said input data transition time.

2. A digital time error signal generator as set forth in claim 1 wherein said digital early sample-late sample circuit means comprises a first pre-accumulate and scale circuit connected in series in said stream of input data.

3. A digital time error signal generator as set forth in claim 2 which further comprises a loop filter coupled to said inverter for producing a sample rate frequency command.

4. A digital time error signal generator as set forth in claim 3 wherein said sample rate frequency command provided as an output from said loop filter is applied to a clock synthesizer for producing a sampling clock signal.

5. A digital time error signal generator as set forth in claim 4 is an on chip I.C. circuit and wherein the output of said inverter means is adapted to be connected to off chip and on chip clock generation means.

6. A digital time error signal generator as set forth in claim 3 wherein said loop filter is a second order loop filter.

7. A digital time error signal generator as set forth in claim 1 which further includes despreader means connected in series between the output error signal output of said early sample-late sample circuit connected means and said accumulate and scale means.

8. A digital time error signal generator as set forth in claim 1 wherein said time error signal generator comprises two data channels each having one said early sample-late sample circuit means and one said accumulate and scale means for generating a said accumulated error signal, each said accumulate error signal from said channels being applied to a multiplexor for selecting one of said two data channels and having an output port connected to an input of said inverter means.

9. A digital time error signal generator as set forth in claim 1 is an on chip I.C. circuit and wherein the output of said inverter means is adapted to be connected to off chip and on chip clock generation means.

10. A digital time error signal generator as set forth in claim 1 wherein said decision directed sign control input means comprises a command generator.

* * * * *